G. F. CONNER.
WIRE FENCE MACHINE.
APPLICATION FILED SEPT. 7, 1916.

1,261,773.

Patented Apr. 9, 1918.
12 SHEETS—SHEET 2.

Witness
E. R. Barrett.

Inventor
George F. Conner
By Pagelsen and Spencer
Attorneys

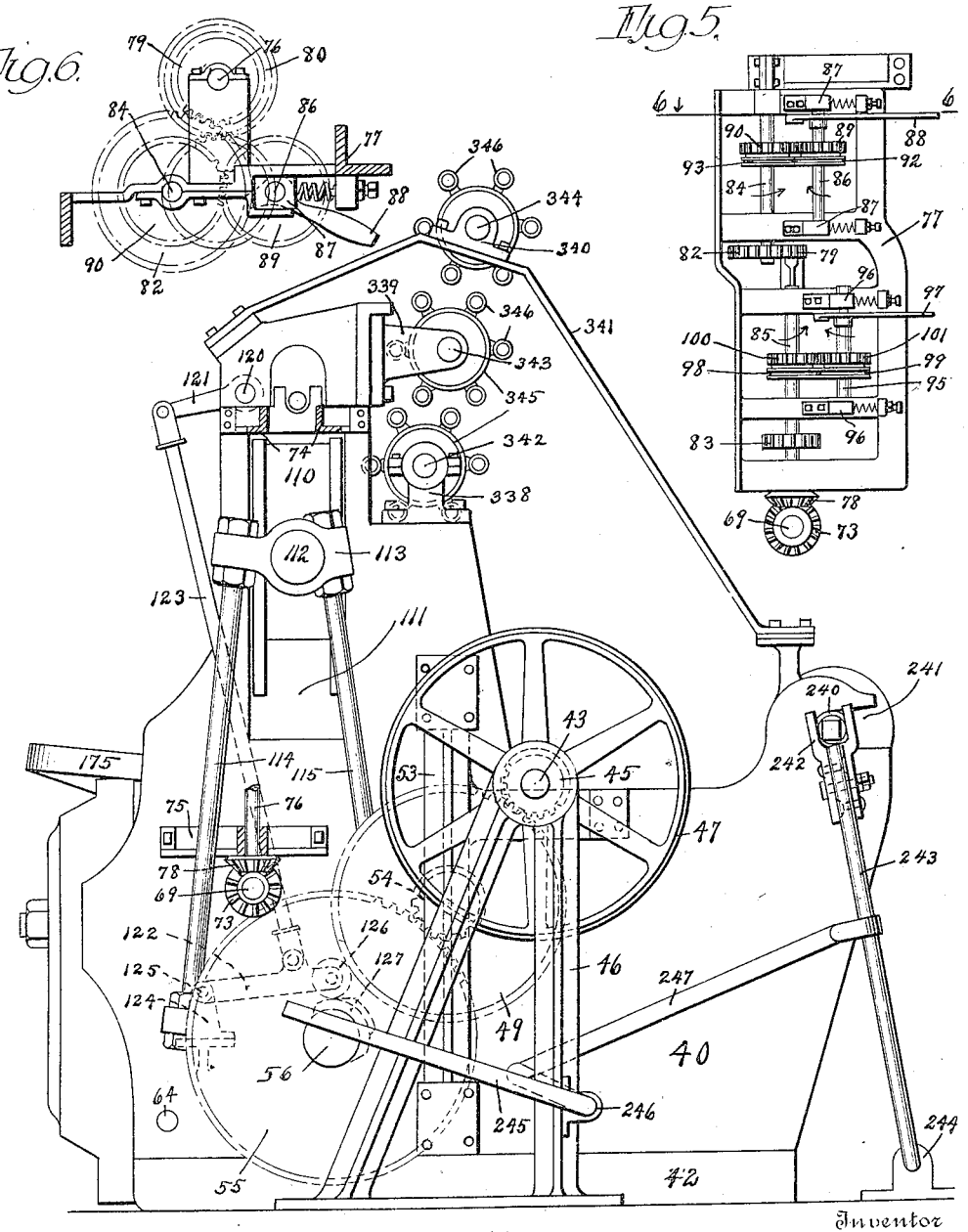

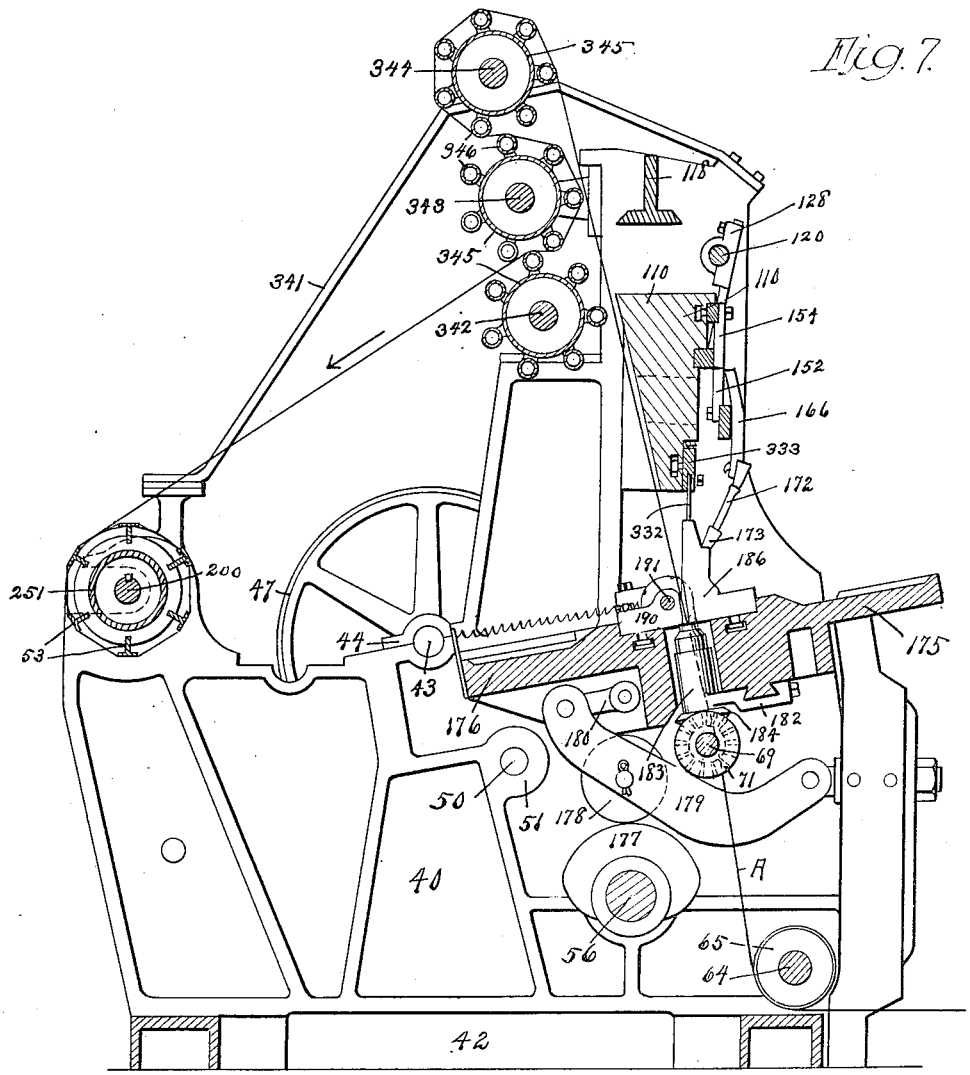

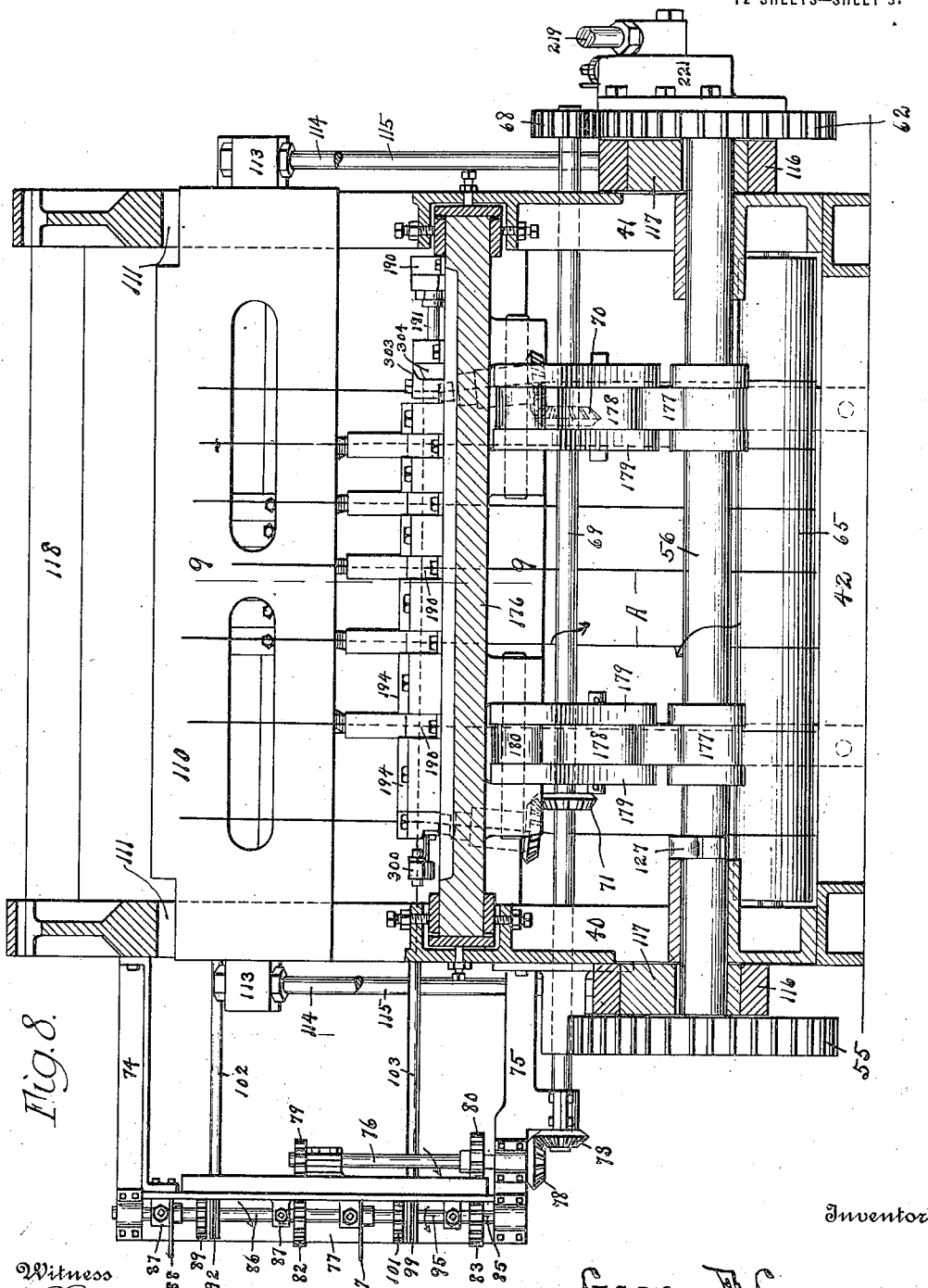

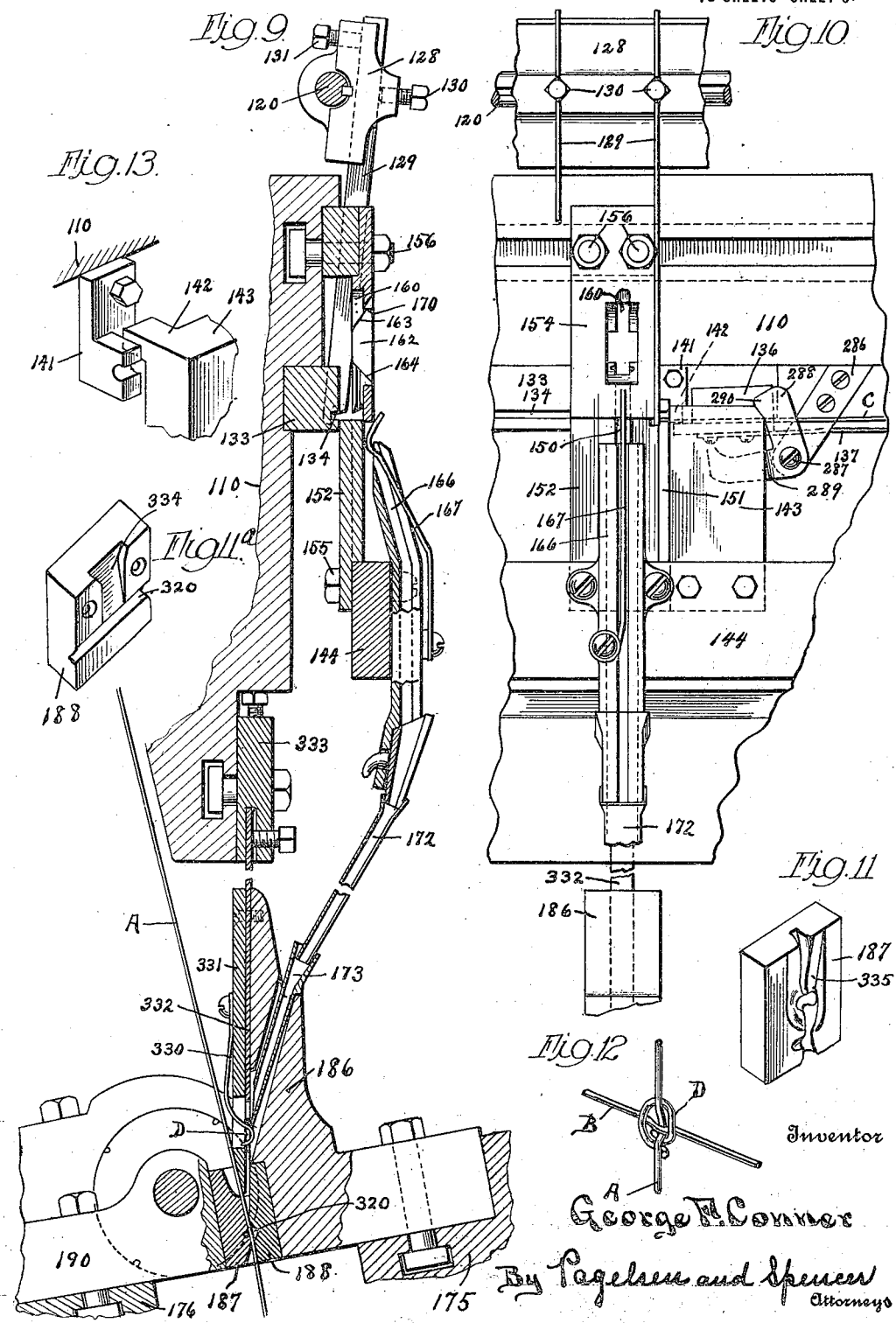

G. F. CONNER.
WIRE FENCE MACHINE.
APPLICATION FILED SEPT. 7, 1916.
1,261,773.
Patented Apr. 9, 1918.
12 SHEETS—SHEET 7.
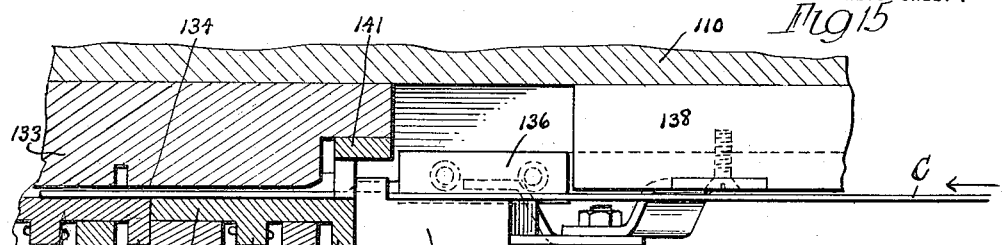
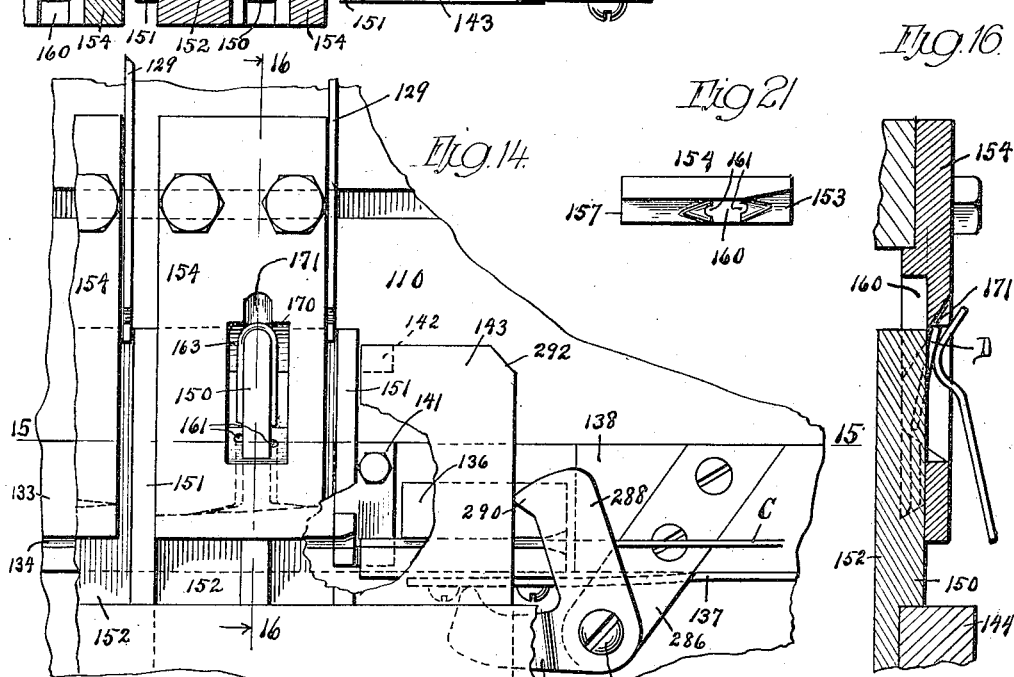
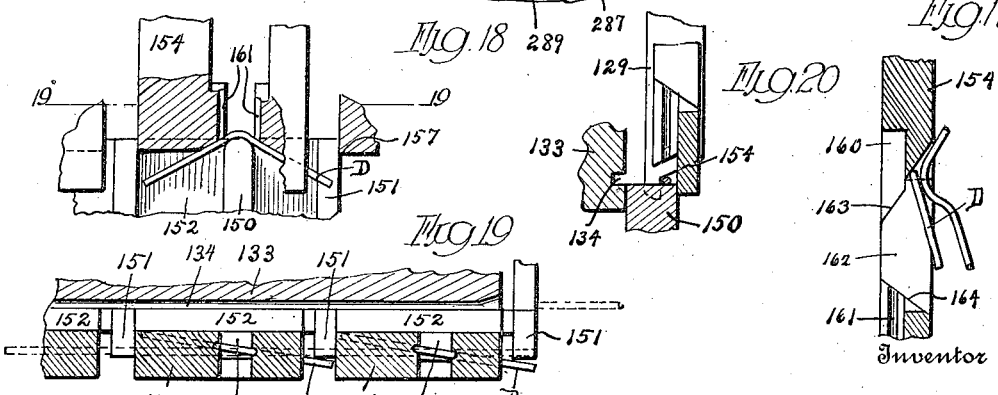

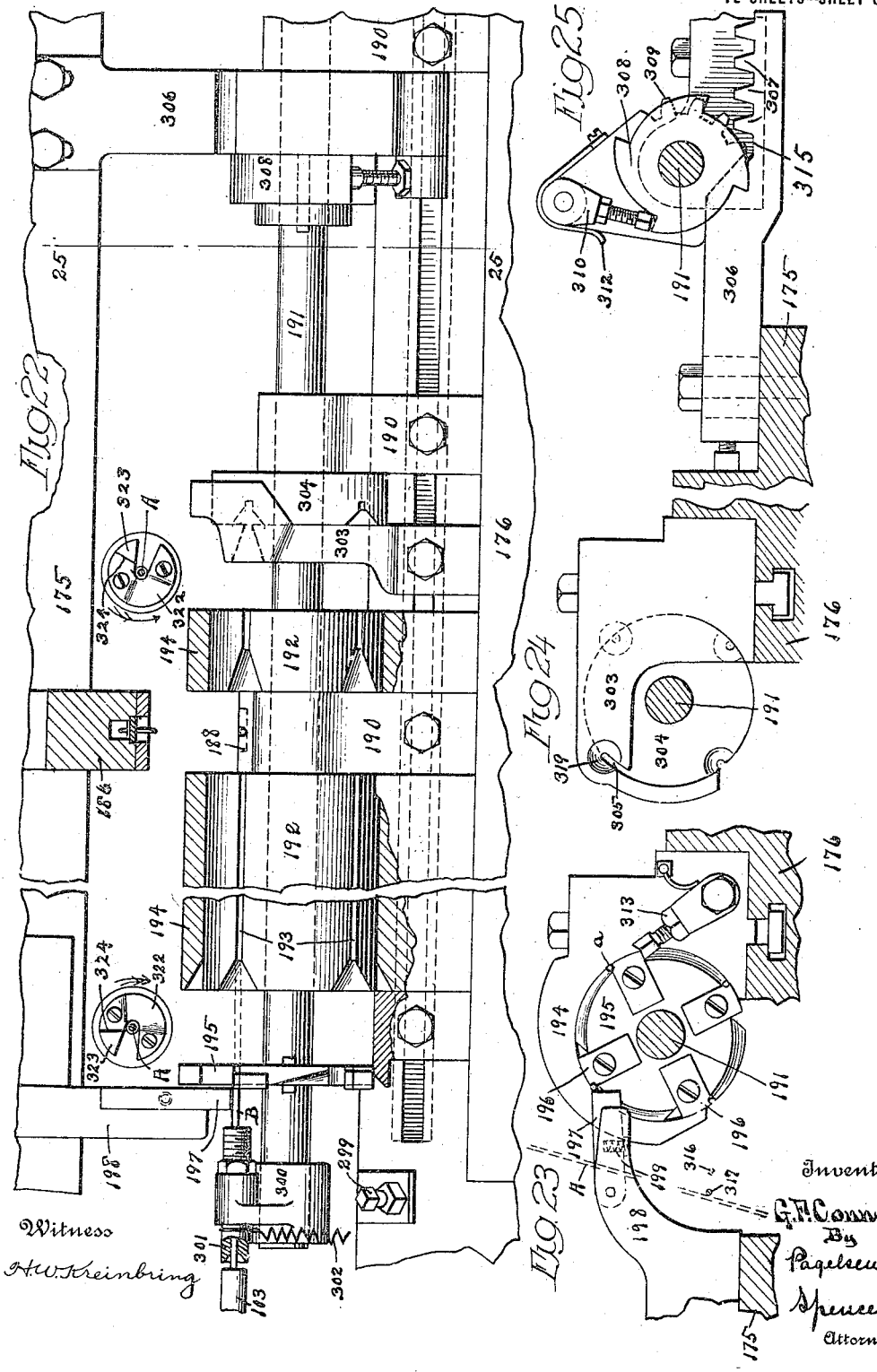

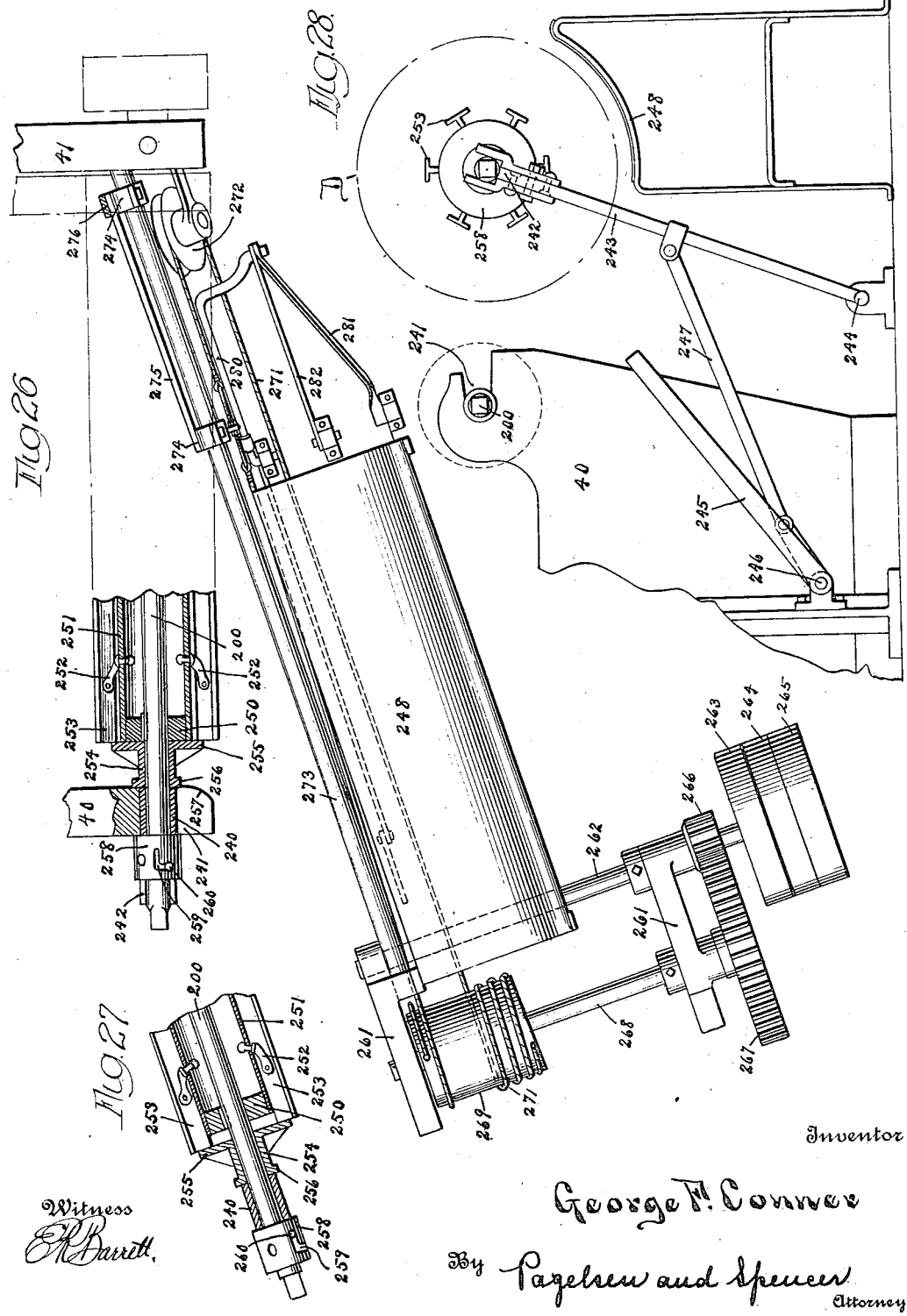

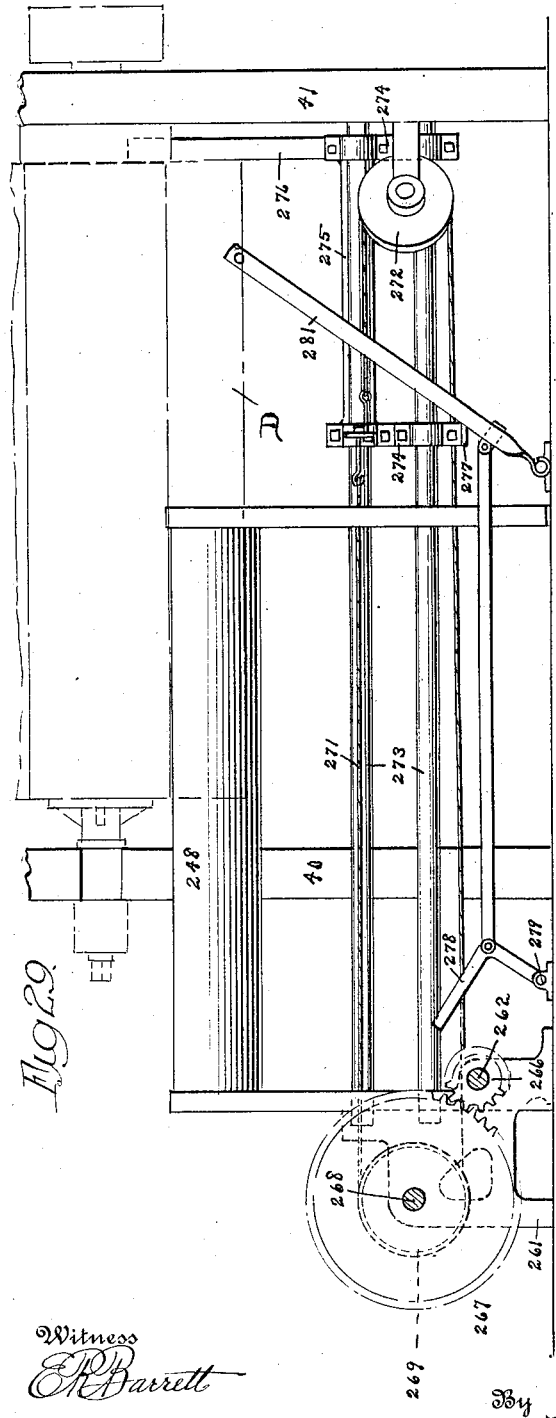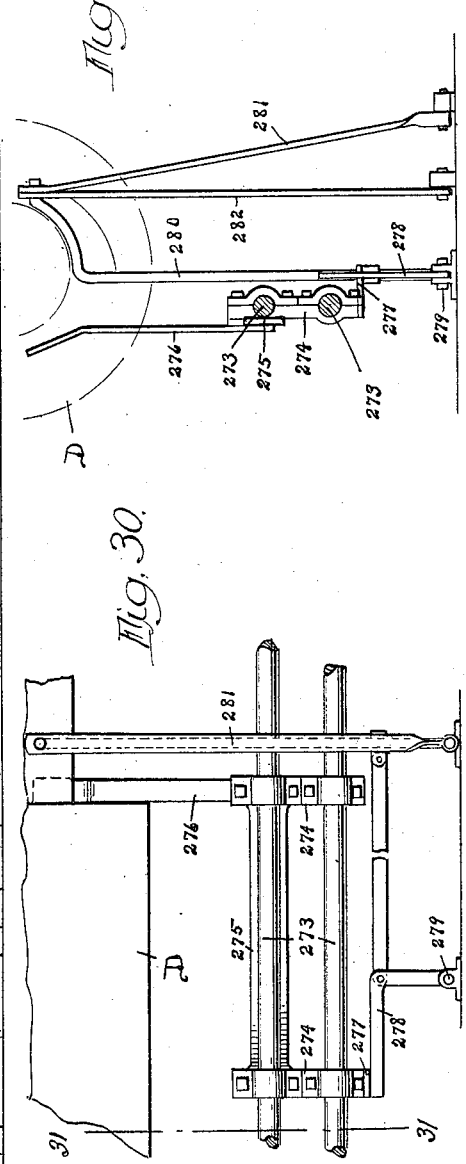

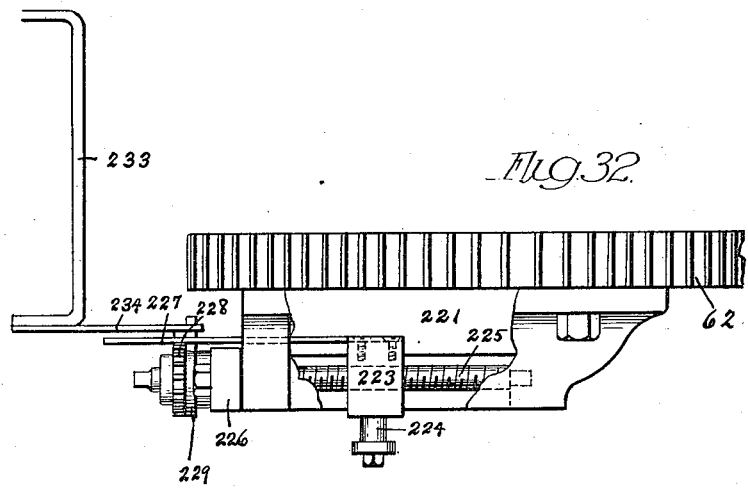
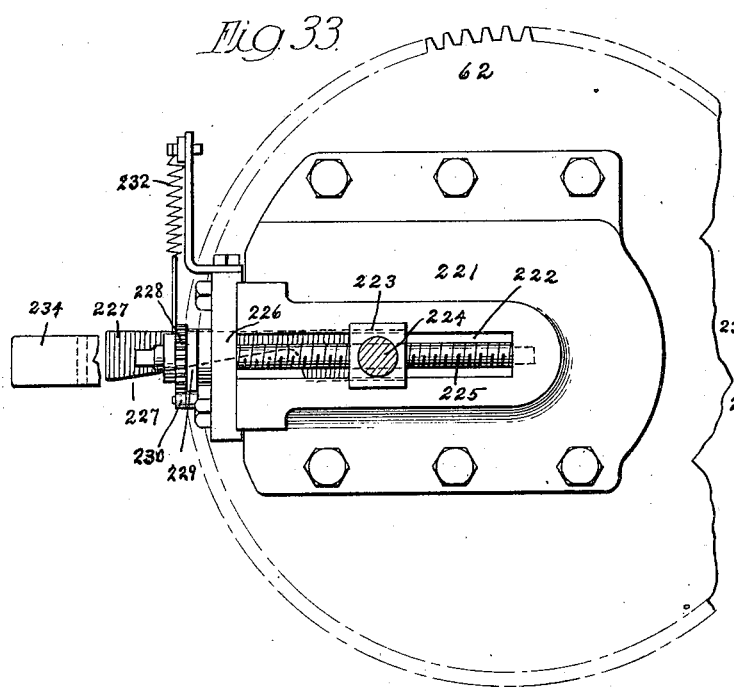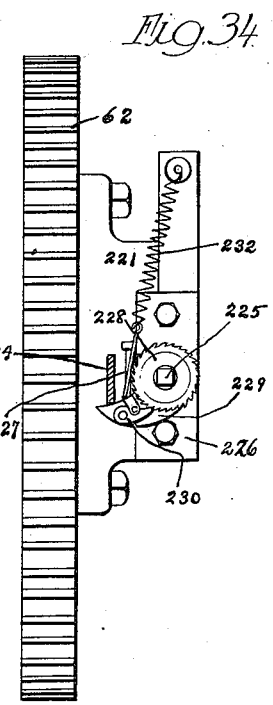

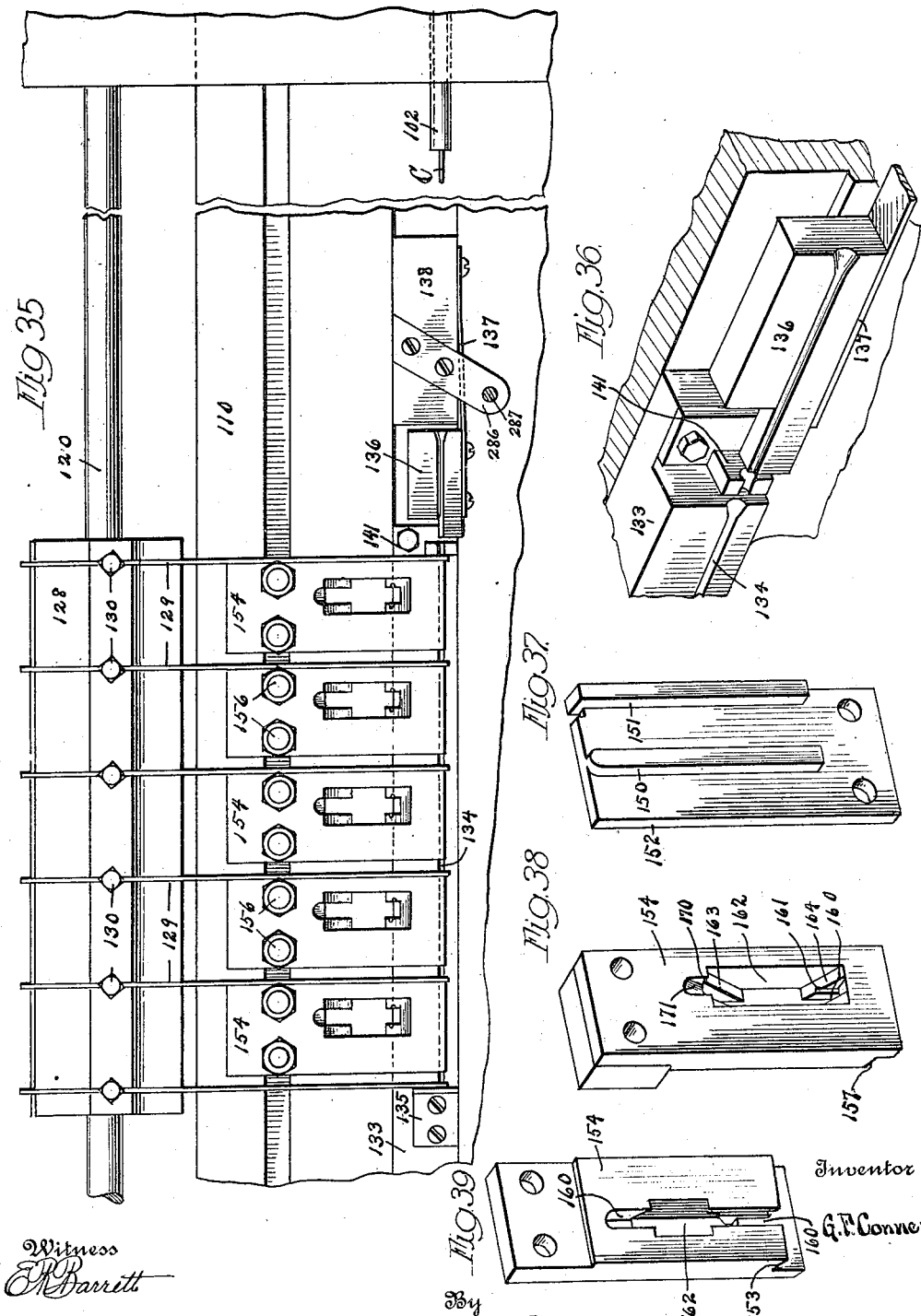

UNITED STATES PATENT OFFICE.

GEORGE F. CONNER, OF PORT HURON, MICHIGAN.

WIRE-FENCE MACHINE.

1,261,773.                    Specification of Letters Patent.      Patented Apr. 9, 1918.

Application filed September 7, 1916. Serial No. 118,831.

*To all whom it may concern:*

Be it known that I, GEORGE F. CONNER, a citizen of the United States, and residing at Port Huron, in the county of St. Clair and State of Michigan, have invented a new and Improved Wire-Fence Machine, of which the following is a specification.

This invention relates to machines for producing wire fence fabrics, and particularly to machines in which the transverse or picket wires are secured to the longitudinal or line wires by twisting the ends of the pickets around the outer line wires and securing the pickets to the intermediate wires by means of staples.

This invention consists in novel means for positioning the picket wires relative to the line wires of a fence, in novel means for spacing the pickets, in novel means for twisting the ends of the pickets around the outside strand wires, in novel means for forming the staples and for distributing them to the dies that attach them to the picket and line wires, in novel means for crimping the finished fabric, and in a novel baling mechanism. It further consists in the details of construction illustrated in the accompanying drawings and particularly pointed out in the claims.

Figure 1:
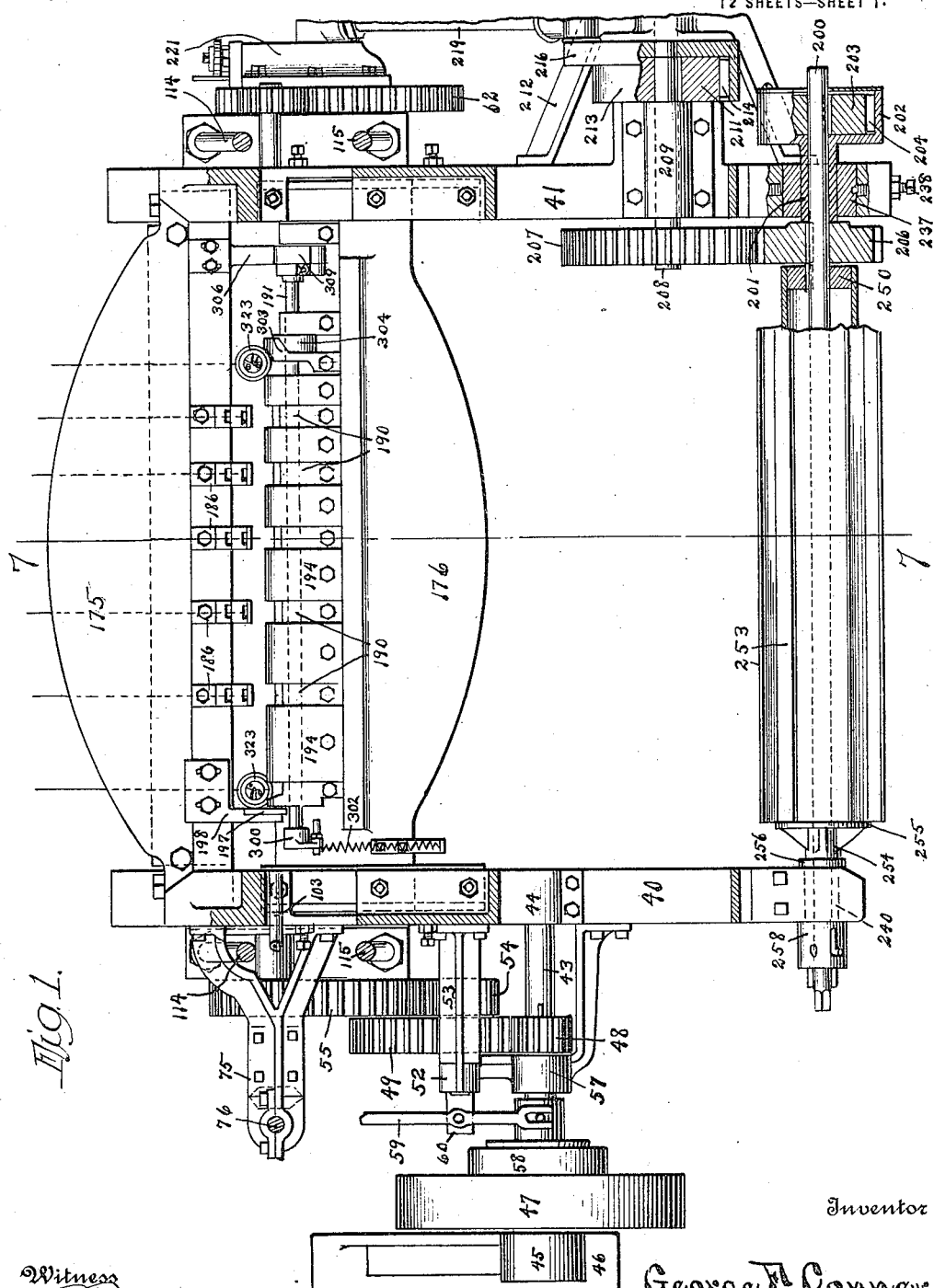
Figure 2:
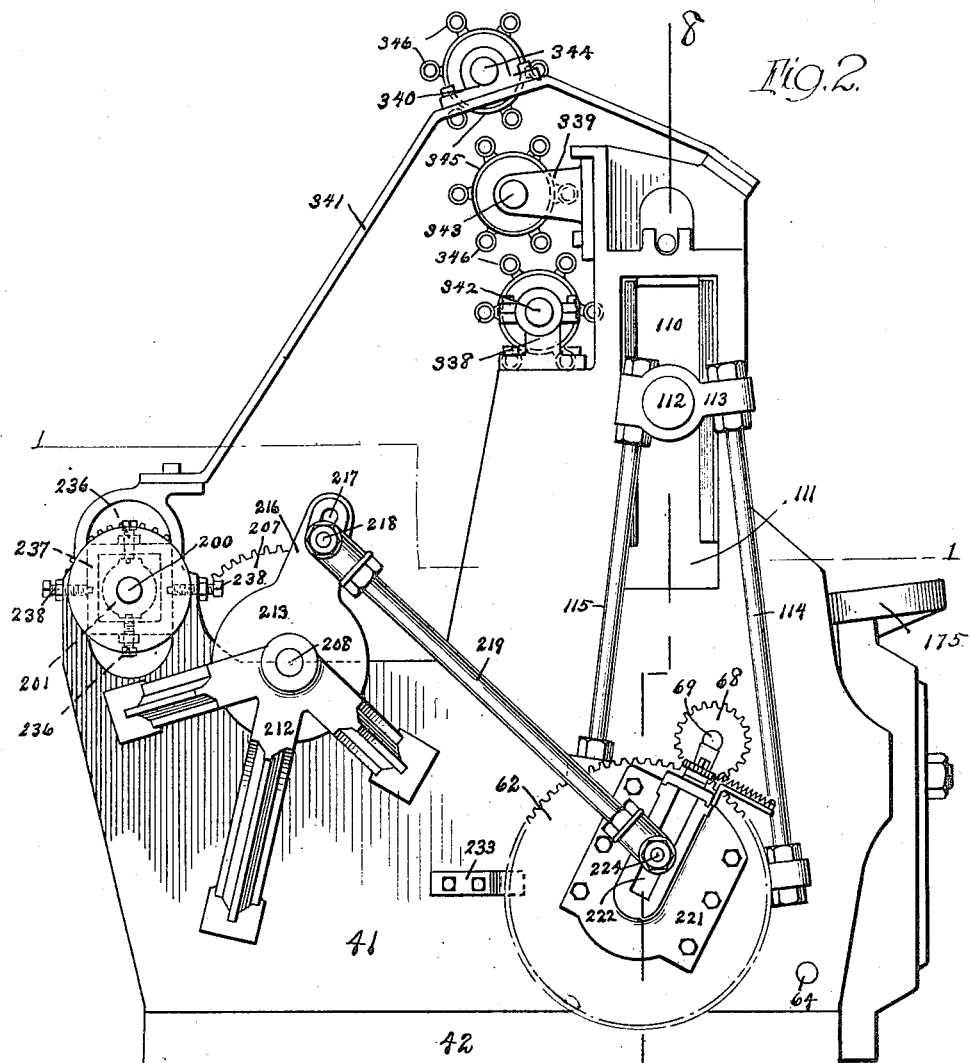
Figure 3:
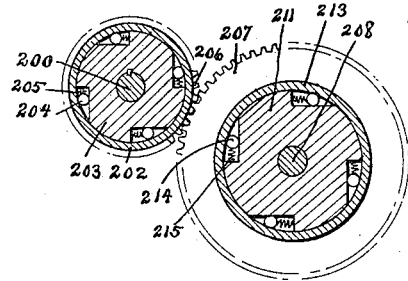

In the accompanying drawings, Figure 1 is a sectional plan of this machine looking at it from the rear or discharge side on the line 1—1 of Fig. 2. Fig. 2 is an elevation of the left end of the machine. Fig. 3 is a detail of the clutch mechanism for driving the right baler. Fig. 4 is an elevation of the right end of the machine. Fig. 5 is an end elevation of the feeding devices for the wires that form the pickets and the staples. Fig. 6 is a longitudinal section on the line 6—6 of Fig. 5. Fig. 7 is a vertical section on the line 7—7 of Fig. 1. Fig. 8 is a vertical section on the line 8—8 of Fig. 2. Fig. 9 is a vertical section on the line 9—9 of Fig. 8 on a larger scale. Fig. 10 is a front elevation of the part of the staple forming device shown in Fig. 9. Figs. 11 and 11ª are perspectives of the staple forming dies. Fig. 12 is a perspective of a staple formed by these dies. Fig. 13 is a perspective view of the shears for the staple wire. Fig. 14 is a front elevation on a larger scale of part of a staple forming mechanism, the elements being in a different position from that shown in Fig. 10. Fig. 15 is a section on the line 15—15 of Fig. 14. Fig. 16 is a section on the line 16—16 of Fig. 14. Fig. 17 is a similar view with the elements in a slightly different position. Fig. 18 is a detail view similar to Fig. 14 with the parts in slightly different positions. Fig. 19 is a plan of the individual forming and shearing blocks for the staples on the line 19—19 of Fig. 18. Fig. 20 is an operative detail of the same. Fig. 21 is a bottom plan of a movable staple forming and shear block. Fig. 22 is a plan of the picket cutting and positioning means looking from the rear. Fig. 23 is a view of the right end thereof. Fig. 24 is a view of the stop for the end of the picket wire. Fig. 25 is a section on the line 25—25 of Fig. 22. Fig. 26 is a plan of the mechanism for stripping the finished bale of fence from the baler, the end of the baler being in section and shown connected to the left end frame 41 by dotted lines. Fig. 27 is a section of the end of the baler when collapsed. Fig. 28 is an end elevation of the cradle for the baler and the mechanism for swinging the baler. Fig. 29 is a rear elevation of the baling mechanism. Fig. 30 is a rear elevation of the stripper for the baler. Fig. 31 is a section on the line 31—31 of Fig. 30. Fig. 32 is a plan of the actuating mechanism for the baler. Fig. 33 is an elevation thereof. Fig. 34 is a view taken from the left of the mechanism shown in Fig. 33. Fig. 35 is a front elevation of the staple cutting and forming mechanism. Fig. 36 is a perspective view of the staple wire guides and shear. Figs. 37, 38 and 39 are perspective views of staple forms and shears.

This machine is constructed to secure cross wires or pickets to the longitudinal or line wires of a fence fabric by winding the ends of properly positioned pickets around the outside line wires and by bending proper staples around both the line wires and pickets at their points of contact, the pickets being cut off to proper length within the machine, and the staples being cut off and bent by suitable devices forming an integral part of the structure.

This machine is also constructed to kink the line wires after the fabric has been completed, to wind the fabric onto a suitable baler, and then to remove the bales of fabric from the baler.

The driving mechanism.

Most of the movable mechanism is carried by the right end frame 40 and the left end frame 41, both mounted on the base 42, although some of the secondary frames or brackets are supported directly on the foundation. A pulley shaft 43 is mounted in the bearing 44 carried by the frame 40, and on the bearing 45 carried by the auxiliary frame 46. On this shaft is secured the driving pulley 47 and the pinion 48, that meshes with a gear 49 on the countershaft 50. This countershaft is carried by the bearing 51 on the frame 40 and by the bearing 52 on the bracket 53 projecting from this frame 40. This countershaft also carries a pinion 54 that meshes with the gear 55 on the main shaft 56 of the machine. A bearing 57 for the pulley shaft 43 may be mounted on the bracket 53. A clutch 58 on this pulley shaft connects the pulley to this shaft and may be of any desired construction. A controlling lever 59 may be pivoted on the extension 60 of the bracket 53. For the purpose of this description, the main shaft 56 will alone be considered hereinafter. This main shaft makes one revolution for each picket and drives the twisters, staple formers, feeders, and shears. On its left end is secured the mechanism for actuating the baler and thereby moving the strand wires through the machine, and the gear 62 for driving the twisters.

A shaft 64 is journaled in the side frames 40 and 41 and carries the drum 65 around which the line wires A pass as they come in from suitable holders at the front of the machine, and then pass intermittently upwardly, the two outside wires passing through the twisters. All the line wires excepting the two at the edges of the fabric, however, pass between the stationary and movable die blocks whereby the picket wires are secured to the line wires. The finished fabric continues upwardly over and then downwardly between the kinking mechanism to the baler, which is turned intermittently to feed the line wires and finished fabric.

The staple and picket wire feeders.

The wires that form the pickets and the staples are fed into the machine by means of the mechanism shown in Figs. 4, 5, 6 and 8. On the main shaft 56 is secured a gear 62 that meshes with the pinion 68 on the countershaft 69, to which are also secured the bevel gears 70 and 71 to drive the twisters, and the bevel gear 73 that actuates the feeding mechanism for the staple and picket wires.

Horizontal brackets 74 and 75 extend from the right end of the machine and support the shaft 76 and the vertical frame 77. On this shaft 76 are the bevel gear 78 that meshes with the bevel gear 73 on the shaft 69, and the spur gears 79 and 80 that mesh with the gears 82 and 83 secured to the shafts 84 and 85 respectively.

A shaft 86 is mounted in slidably held bearings 87, controlled by a lever 88, on the frame 77, and carries a gear 89 meshing with the gear 90 on the shaft 84, and a grooved feed roller 92 in engagement with a similar roller 93 on the shaft 84. Normally these rollers are pressed against each other by means of springs sufficiently to feed the staple wire C, but may be swung apart to release the wire by means of the lever 88.

A shaft 95 is also slidably mounted in the bearings 96 on the frame 77 and may be forced away from the shaft 85 by the lever 97 to free the picket wire B from the pressure of the rolls 98 and 99, which rolls turn together by reason of intermeshing gears 100 and 101 on the shafts 85 and 95 respectively. The pressure between the feed rolls and the picket and staple wires is sufficient to move the wires but not sufficient to kink them, for any substantial resistance to the movement of the wires will cause slippage thereof between the rolls. When leaving the rolls the staple and picket wires will be supported by the tubes 102 and 103 through which they respectively pass. These tubes are so mounted that their inner ends may swing.

The staple formers.

The staples necessary to secure a picket to all of the inner line wires are formed simultaneously. To avoid wasting material, the mechanisms for forming the individual staples are placed close together and the finished staples are then conveyed to the die blocks by means of diverging chutes. The staples are set to proper length and bent by means of a vertically reciprocating rail and devices thereon coacting with stationary members.

The movable staple rail 110 is guided in the vertical slots 111 in the side frames and has a pin 112 at each end on which the cross-heads 113 are mounted. Rods 114 and 115 connect these cross-heads to the straps 116 around the eccentrics 117 on the main shaft 56. The rail will therefore move up and down at each revolution of the main shaft. A cross bar 118, above the slots 111 between the frames 40 and 41, prevents the frames from moving in and out.

Mounted in these frames is a shaft 120, to which is secured a crank arm 121 (Fig. 4) which connects to an actuating arm 122 by means of a link 123. A bracket 124 on the inner side of the frame 40 carries a pin 125 on which the arm 122 is mounted. The arm 122 has a roller 126 on its outer end that engages the cam 127 on the main shaft 56. The location of this cam is indicated in Fig. 8.

Secured to this shaft 120 is a longitudinal block 128 formed with transverse slots to receive the vertical arms 129, one for each staple mechanism. These arms are held in position by the screws 130 and adjusted by the screws 131. The purpose of these arms is to move the length of wire, that is to form all the staples required to secure one picket to the strands, after such length has been cut off, forward onto the staple-forming mechanism.

The rear side of the movable staple rail 110 is preferably beveled to permit the free passage of the finished fence, even when the rail is in its lowest position. Secured to the front side of the rail is a guide bar 133 having a longitudinal groove 134 in which the staple wire C is slid by means of the feeding mechanism heretofore described. At the left end of the bar 133 is a stop 135 to limit the movement of the staple wire. This wire is supported by means of the guide tube 102, which in any desired manner (not shown) may be pivoted at its outer end so that its inner end may swing up and down. A guide block 136 is mounted at the right side of the staple formers on a spring 137 carried by a projection or rib 138 on the rail 110. Between the right end of the guide bar 133 and the guide block 136 is located the shearing mechanism which operates just as the rail 110 reaches the upper limit of its movement.

This shearing mechanism consists of the movable member 141, shown in Fig. 13, secured to the rail 110, and the stationary member 142 that is carried by a plate 143 secured to the stationary rail 144. This member 142 projects rearwardly adjacent the member 141 and above the end of the guide block 136. Fig. 10 shows the parts just after the wire has been sheared and shows the end of the wire below the shear member 142, and the guide block 136 and its supporting spring swung down relatively to the movable shear member 141.

The plate 143 holds the wire in its grooves in the guide bar and guide block. Immediately after the wire has been sheared, the arms 129 on the shaft 120 swing forwardly and move the severed length forwardly until it rests on the upper ends of the rearwardly projecting ribs 150 and 151 on the plates 152 of the stationary staple benders, and are therefore below the shoulders 153 on the plates 154 which constitute the movable staple benders. The stationary plates 152 are secured to the stationary rail 144 by means of screws 155, while the bolts 156 secure the plates 154 to the rail 110.

As shown in Fig. 19, the plates 152 are back of the plates 154, and the ribs 151 project forward between adjacent plates 154. The outer edge of each rib 151 is quite close to the edge of the next plate 154 to the right, as shown in Fig. 19, and forms a shear in connection with the edge 157 of the shoulder 153 of said plate 154. The plates 154 are formed with vertical grooves 160 in their rear faces, the sides of the lower ends of these grooves being formed with narrow grooves 161 for the staple wires. The plates 154 are also formed with openings 162 somewhat wider than the grooves, whose upper walls 163 and lower walls 164 are inclined as shown in Figs. 17 and 38. The ribs 150 are slidable in the grooves 160.

Secured to the stationary rail 144, as shown in Figs. 9 and 10, are guides 166 for the completed staples, and springs 167 are mounted on the front side of these staple guides.

As stated before, a necessary length of wire is cut at the end of the up-stroke of the rail 110 and this length is then moved forward by means of the arms 129 so that it lies on the ribs 150 and 151 of the staple formers. The plates 154 then come down and the edges 157 co-acting with the outer edges of the ribs 151 shear the wire into staple lengths. Referring now to Fig. 21, it will be noticed that the face of the shoulder 153 is cupped at the ends of the grooves 161, and that the right end of the general line of the cup is toward the front. Fig. 39 shows that the shoulder 153 inclines downwardly toward the rear and that the portion to the left of the groove 160 is also undercut. As the plate 154 descends, its edge 157, together with the adjacent rib 151, shears the wire. As soon as the staples are sheared, the lower ends of the blades 129 move forwardly another step, the cam 127 (Fig. 4) being of two steps, and this movement of these arms swings the right ends of the staple blanks D forward of the upper ends of the ribs 151, as shown in Fig. 19. This causes the left ends to move back about the same distance. Immediately thereafter the curved upper end of each rib 150 enters the groove 160 and the cupping shown in Fig. 21 causes the staple blanks D to properly enter the grooves 161.

As the rail 110 and plates 154 descend the staple D will be bent, as indicated in Fig. 18, until its two arms are parallel and in the grooves 161. The plates 154 continue to go down until the staples D are up in the openings 162, as shown in Figs. 14 and 16, at which time they are carried forward by means of the inclined upper wall 163 of the opening, as shown in Fig. 16. As the staple slips off the upper end of the rib 150 it will engage the shoulders 170 on the plates 154, being held there by the springs 167, and its lower ends will be tipped out, as shown in Fig. 17, due to the action of the spring which forces the curved upper end of the staple into the groove 171 between these shoulders. The spring then slides up on the incline 171 and is pushed out to release the staple which falls down into the chute 166, thence into the conveyer 172 and the guide 173. The conveyers 172 are adjustable so that they can carry the staples laterally to the guides 173, however these may be spaced. The staples that drop from the ribs 150 at substantially the lower limit of the downward stroke of the movable staple rail are bent around the picket and line wires at the end of the next downward stroke of this rail. Before describing this action, it is necessary to take up the picket positioning device.

*The picket mechanism.*

As stated before, the picket wire B is fed into the machine by means of the mechanism shown in Figs. 5 and 8, particularly by means of the two co-acting disks 98 and 99 which push the metal through the tube 103 to the picket mechanism. This consists of a heavy beam or girder 175 which is secured at its ends to the side frames 40 and 41, a movable frame 176 and the mechanism connected thereto. The frame 176 is moved back and forth by means of cams 177 secured to the shaft 56, which cams engage the bearing rollers 178 on the levers 179, which, in turn, connect to the frame 176 by means of links 180. Each of the two frames is provided with T-slots to receive the bolts that secure the various dies in position.

At each cycle of the machine, the shaft 56 makes one revolution and the frame 176 moves forward up to the stationary frame 175, during which movement the picket is cut off and carried into proper position relative to the strand wires. The frame 176 remains in its forward position for a limited length of time during which the staples are secured around the pickets and strands and the ends of the pickets wound around the outer strands. It will be noticed that the high portions of the cams 177 are nearly one hundred and eighty degrees in length and that therefore sufficient time is given for the rail 110 to make nearly all of its downward stroke. The timing of the cams 177 and the eccentrics 117 is such that the rail 110 starts down before the movable frame 176 reaches its forward position and starts up before the frame leaves its forward position. The reason for this is that the mechanism which bends the staples around the strands and pickets must be entirely out of the way before the finished fabric is moved, which occurs as soon as the frames separate.

Brackets 182 are secured to the frame 175 and support the bearings 183 for the twisters which are driven by means of the bevel gears 184 that mesh with the gears 70 and 71 on the shaft 69. These twisters are inclined inwardly as shown in Fig. 8 and are constantly driven to make four revolutions during each cycle, and to make about one and one half revolutions between the time the picket is placed against the strands and before the finished fabric is moved. The tops of the twisters are inclined toward each other so that as the ends of the pickets are wound around the strands they will pass under the main portion of the picket without touching or interfering.

The stationary frame 175 supports the brackets 186 which carry the staple guides and feeders and also support the dies 188 which, together with the dies 187 carried by the movable frame 176 bend the staples around the pickets and strands. The dies come together after the picket has been positioned and the staples are forced down into the dies while the dies are held stationary.

The mechanism for positioning the pickets is as follows: Mounted on the movable frame 176, as shown in Figs. 1 and 8, are a series of bearings 190 which carry a revoluble shaft 191 to which are secured a number of drums 192 provided with bell-mouthed grooves 193, the grooves of the various drums being spaced 90 degrees apart and in alinement. Each drum is partially surrounded by a case 194 which holds the pickets in the grooves 193. Near the right end of the shaft is a disk 195 which is provided with shear members 196 adapted to coact with the shear member 197 which is mounted on the stationary bracket 198 and normally held up by means of a spring 199. Revoluble on this shaft 191 is a guide in the form of a crank arm 300 which carries a hard metal tube 301 that receives the wire B from the tube 103. This arm is normally held toward the rear by means of the spring 302.

A guide plate 303 is secured to the frame 176 and adjacent to it is a stop disk 304.

The stop disk has a series of bell-mouthed openings into which the wire is received while the plate 303 has a guide opening 305.

Extending rearwardly from the frame 175 is a rack bar 306 having teeth 307. On the shaft 191 is secured a ratchet wheel 308. Adjacent the ratchet wheel is a mutilated gear 309 that meshes with the teeth 307 and carries a pawl 310 adapted to engage the teeth of the ratchet wheel under pressure of the spring 312. A pawl 313 (Fig. 23) prevents the shaft and the drums from turning backward.

The operation of this portion of the device is as follows: The frame 176 is moved forward by means of the cams 177 and slides back because of its own weight and that of the parts connected to it. Each time it moves forward, the shaft 191 is carried with it. As this occurs, the rack bar 306 turns the mutilated gear somewhat more than ninety degrees. During the first movement of the frame, the shaft is not turned at all because the pawl 310 moves some distance before it engages the next tooth of the ratchet wheel 308. During the last part of the movement of the frame, the shaft is also at rest in its bearings because of the space 315 adjacent the first tooth on the rack-bar, as shown in Fig. 25. Between these rests, the shaft is turned ninety degrees.

During the first part of this cycle, the picket wire is moved forward (to the left in Fig. 23) and is cut off by the shear members 196—197. During the turning of the shaft, the wire reaches the point 316 indicated in Fig. 23. During the last part of the movement, when the shaft does not turn, the severed picket passes to the point 317, where it lies against the strand wires A and on top of the twisters.

As stated, the wire B is sheared immediately after the shaft 191 begins to move forward. At that instant, the spring 302 swings the arm 300 back ninety degrees, during which movement the wire B is fed inwardly. The new end of the wire slides along the grove 318 in the disk 195 until it strikes the next cutter 196 and slides across in front of it at the point $a$ and passes into the proper grooves 193 in the drums 192 until by the time the machine has made a full cycle of movement the wire B enters the funnel 319 at the upper end of the groove 305 in the guide plate 303 and then passes into one of the holes in the disk 304. The rearward movement of the arm 300 is limited by the adjustable stop 299 shown in Fig. 22.

While this feeding of the wire B goes on, the shaft 191 is turning and the upper part of the disk 195 is moving forward. This will carry the wire B from the point $a$ (Fig. 23) up over and back of the shear member 197 to just above the pivot of said member. When the movable frame 176 travels rearwardly, the picket wire would be cut off if the shear member 197 was not pivotally mounted.

As the severed picket wire crosses the horizontal plane of the shaft 191, it moves in between the dies 187 and 188 to the level of the notches 320 in the dies 188 (Fig. 11ª) and at the last rearward movement of the frame 176, the picket wire is pressed into these notches against the strand wires and bends them in the manner shown in Fig. 12.

When the picket wire is thus positioned it rests on the two twister dies 322 (Fig. 22) provided with projections 323 having edges 324 that engage the pickets. Because of the inclination of the twisters, the outer ends only of the pickets will be engaged by these edges and these will be given about one and one half turns around the strand wires. It is obvious that the number of turns can be increased by increasing the speed of the twisters. During the twisting, the picket wire is held in position by the pairs of dies 187 and 188 and the drums 192 between these pairs. The dies 187 are preferably secured to the forward faces or sides of the bearings 190 of the shaft 191, as shown in Fig. 9.

The staples D are sheared and bent by the mechanism shown in the upper portion of Fig. 9 and slide down the diverging conveyers 172 to the guides 173, where they are stopped by the springs 330 mounted on the plates 331 that are secured to the brackets 186. These plates are also parts of the guides for the narrow blades or plungers 332 that are held in adjustable blocks 333 on the lower edge of the rail 110. The groove 334 in the face of the die 188 and the recess 335 in the face of the die 187 are of sufficient width to receive this blade, which is just about the width of the staples. The operation of this mechanism occurs just before the dies separate to release the fabric and consists in driving the staple down into the grooves in the face of the die 187 until the ends are bent as shown in Fig. 12.

*The kinking rollers.*

It has been found desirable to kink or corrugate the fence fabric in order to keep it moderately tight when put up. To do this pairs of bearings 338 and 339 (Fig. 2) are mounted on the main frames and a third pair 340 is mounted on the bars 341 carried by these frames. Shafts 342, 343 and 344 are mounted in these bearings and carry rollers 345 having longitudinal ribs 346 in the form of cylinders. The wire fabric as it comes up from the dies passes between these kinking rollers, as shown in Fig. 7, and becomes permanently corrugated, although a moderate stress will flatten it temporarily.

These rollers are rotatable by the strand wires under the stress of the baler drum, and this stress tends to keep the wires under tension against each rib on the rollers and thus prevents slipping. If the fluted rollers were power driven there would be danger of forming loops between some of them and the baler unless expensive mechanism were provided to take up such slack. The principal advantage lies in the even travel of all the strand wires as they pass through the machine.

*The baling mechanism.*

At the rear end of the machine is the baler shaft 200 which is mounted in the sleeve 201 shown in Fig. 1. On the outer end of this sleeve is a female cylindrical roller-clutch member 202, within which is the male clutch member 203, shown in Fig. 3, which member is secured to the shaft 200. Rollers 204 and springs 205 complete this clutch which permits the shaft to be turned in one direction. The shaft 200 has a pinion 206 secured to it which pinion meshes with the gear 207 on the shaft 208, journaled in the bearing 209 carried by the frame 41.

The shaft 208 is driven by a roller clutch, the inner male member 211 of which is secured to the shaft. A bracket 212 not only furnishes a bearing for the outer end of this shaft 208, but also holds the outer female member 213 of the clutch in position. The rollers 214 and springs 215 are of usual construction. The member 213 carries an arm 216 having a slot 217 in which the pin 218 is mounted. The rear end of the connecting rod 219 attaches to this pin.

Secured to the gear 62 on the main shaft 56 is a frame 221 having a guide slot 222 for the nut 223 which carries a pin 224 which extends through the eye in the forward end of the connecting rod 219. The throw of this pin is determined by the screw 225 mounted in the cross bar 226 on the frame 221. A plate 227 secured to the nut determines the movement of the screw and a separate plate 227 may be employed for each type of fence. Secured to the screw 225 is a ratchet wheel 228, and just inside of the wheel is a lever arm 229 that carries the pawl 230. A spring 232 returns this arm to normal position. A bracket 233 is secured to the frame 41 and has a finger 234 projecting into the path of this arm 229 so that at each revolution of the shaft 56 the screw 225 is turned to reduce the radius of the pin 224 as the diameter of the bale of fence being wound on the baler increases in diameter, this resulting in a uniform feed of the line wires through the machine.

The bale does not increase in direct proportion to the number of revolutions of the crank pin 224, for the reason that it requires a constantly increasing length of fence to extend around the already baled fabric. For this reason, the pin 224 must move toward the center of the carrier 221 at an ever decreasing rate. By properly tapering the plate 227, as shown in Fig. 33, the amount the screw 222 is turned at each action of the pawl 230 decreases substantially as the circumference of the bale increases.

The sleeve 201 is carried between two vertical set-screws 236 that are carried in the yoke 237, which in turn is pivotally held between the horizontal set-screws 238 carried by the frame 41. This permits the opposite end of the shaft 200 to be swung out rearwardly and to be moved up and down as required to discharge a finished bale of fence, particularly as the gear 207 and pinion 206 are on the inside of the frame. Because of the roller clutch on the end of the shaft 200 this shaft cannot be revolved backwardly and so unwind the fabric.

The opposite end of the shaft 200 is mounted in a bearing sleeve 240 that fits in a pocket 241 in the frame 40. The outer end of the shaft 200 extends into a fork 242 at the upper end of the strut 243 which is pivoted at 244. A lever 245 pivoted at 246 on the frame 40 connects to this strut by means of the link 247. By swinging the lever 245 over to the rear, the right end of the shaft 200 and the baler and bale mounted thereon are carried to the rear, as shown in Fig. 28, where the bale may be received on the saddle 248.

Collars 250 are secured to the baler shaft and secured to the collars is a cylinder 251 having holes to receive the dogs 252 which are pivoted to the webs of the T-bars 253. On the right end of the baler shaft (left end in Fig. 26) is a collar 254 having a flange 255 which engages the ends of the T-bars and a smaller flange 256 which engages the inner face of the frame 40, particularly the cam 257 formed on this frame.

When the parts are as shown in Fig. 26, the pressure of the bearing sleeve against the collar 254 holds the flange against the ends of the bars 253 which are held out by the dogs 252. A collar 258, having a bayonet slot 259 to receive the pin 260 in the baler shaft, normally holds the flange 255 against the ends of the bars 253 and therefore holds the baler expanded. But when the fabric that has been wound onto the baler is to be removed, the end of the shaft is swung over by means of the lever 245 until the bale rests on the cradle 248. The collar 258 is then turned and permitted to slip to the position shown in Fig. 27, which permits the baler to collapse, after which the bale D is removed. The shaft is then swung back, the flange 256 engaging the cam 257 and being forced inwardly thereby, thus causing the bars 253 to move outwardly to expanded position, after which the collar 258 is returned to the position shown in Fig. 26.

To remove the bale D from the baler after the bale has been swung onto the cradle 248, the mechanism shown in Figs. 26, 29, 30 and 31 may be employed. Two frames 261 support the countershaft 262 having pulleys 263, 264 and 265 and the pinion 266 secured to it. The pinion meshes with a gear 267 on the shaft 268 which shaft has secured to it the drum 269. A cable 271 connects to this drum and extends around the wheel 272 which is supported by the frame 41. Guide bars 273, preferably round, are supported by one of the frames 261 and 41 and on them is slidable a crosshead formed of vertical members 274 and a horizontal member 275. An arm 276 projects up from one end of the cross-head and engages the adjacent end of the bale when the drum 269 turns to the left in Fig. 29, and pushes the bale off the baler onto the cradle 248. When the belt that runs on the pulleys 263—264—265 is shifted, this cross-head returns to normal position.

A finger 277 on this cross-head engages the lever 278, pivoted at 279, when the cross-head nears the operative end of its stroke, and swings this lever from the position shown in Fig. 29 to that shown in Fig. 30. This causes the struts 280, 281, 282 to be swung up into such position that it will prevent the baler from falling when the bale has been slipped off, it being understood that at such time the sleeve 240 is not in the notch or slot 241 in the frame 40. After the bale has been slipped off the baler, the latter is returned by means of the construction shown in Fig. 28.

The proportions and details of the various parts of the machine can all be changed by those skilled in this art without departing from the spirit of my invention. Safety devices may be added where necessary or desirable. One of these is shown in Figs. 14 and 15. As stated before, the guide block 136 is carried by a spring 137. To insure a proper position of this block at all times, positive means may be employed. A bracket 286 is secured in a groove in the ridge or rib 138 and carries a pivot 287 on which is mounted a bell crank having one arm 288 in the plane of the shear plate 143 and the other arm 289 extending below the block 136. The arm 288 has an angular extension 290 that projects over the beveled corner 292 of the plate 143 when the rail 110 is at the upper limit of its movement, the wire C has just been sheared and the cutter 142 has pushed down the block 136 and spring 137, as shown in Fig. 10. But as soon as the rail 110 descends, the plate 143 will swing the arms 288 and 289 to the position shown in Fig. 14, bringing the groove in the block 136 into exact alinement with the groove 134.

The advantage had by employing the crimping rolls shown in Fig. 7 is of great importance. The strand wires come to the machine from reels and as these wires are not evenly wound into these reels, the tension thereon is very uneven. This usually results in a very uneven winding of the finished fabric on the strand wires of the finished fabric on the baler and hence in a fabric having one edge longer than the other or both edges longer than the middle. The fabric when erected as a fence may have either top or bottom or both very loose while another portion of the fence is tight, or vice versa.

But by employing fluted rolls such as shown in the drawings, and compelling the finished fabric to pass around substantially one half of the circumference of two of the rolls, the strand wires are prevented from slipping and uneven strains on those portions of the wires outside of the machine does not effect those portions beyond the crimping rolls. The wires are bent at the many points of contact with the ribs of these rolls and therefore locked to the rolls by their own stiffness, thus preventing any slippage of the wires at these points. The lowest of the three rolls insures positive contact with the last one or two ribs on the middle roll, thus preventing the bends of the strand wires from beginning to slip. The same principle is made use of as in snubbing a steamer at a dock by means of a line cross-wound around two posts.

It will be noticed that both the picket and staple wires are guided and held throughout their length within the machine. Because of this, wire may be taken directly from the reels and fed into the machine without first passing through straighteners and thus avoid the danger of having the galvanizing scraped off.

I claim:—

1. In a wire fence machine, the combination of means for feeding strand wires through the machine, means for continuously feeding picket wire horizontally into the machine at right angles to the strand wires, means for severing the picket wire and for moving it laterally against the strand wire, means for twisting the ends of the picket around the outer strand wires, means for substantially continuously feeding a staple wire into the machine, means for severing and bending the bent staples, means for guiding the staples to the points of contact between the strand wires and the pickets, and means for bending the staples around the strand wires and pickets.

2. In a wire fence machine, the combination of means for feeding strand wires through the machine, means for placing pickets in proper contact with the strand wires, means for feeding a staple wire into the machine, means for cutting off sufficient wire to form the staples required to secure one picket to the strand wires, means to cut the wire into staple lengths, means to bend each staple intermediate its ends and then feed it to a point of contact of the picket and a strand wire, and means to bend the ends of the staple around the picket and strand wire.

3. In a wire fence machine, the combination of means for feeding strand wires upward through the machine, means for continuously feeding picket wire horizontally into the machine at right angles to the strand wires, means for severing the picket wire and for moving it laterally against the strand wire, means for twisting the ends of the picket around the outer strand wires, means to constantly drive said twisting mechanism, means for feeding staple wire into the machine, means for severing and bending the staples, means for guiding the staples to the points of contact between the strand wires and the pickets, and means for bending the staples around the strand wires and pickets.

4. In a wire fence machine, the combination of means for feeding strand wires upward through the machine, means for continuously feeding picket wire horizontally into the machine at right angles to the strand wires, means for severing the picket wire and for moving it laterally against the strand wire, means for twisting the ends of the picket around the outer strand wires, means for feeding staple wire into the machine, means for severing and bending the staples, means for guiding the staples to the points of contact between the strand wires and the pickets, and means for bending the staples around the strand wires and pickets, said means comprising pairs of dies and movable plungers to force the staples into said dies.

5. In a wire fence machine, the combination of means for feeding strand wires upward through the machine, means for continuously feeding picket wire horizontally into the machine at right angles to the strand wires, means for severing the picket wire and for moving it laterally against the strand wire, means for twisting the ends of the picket around the outer strand wires, means to constantly drive said twisting mechanism, means for feeding staple wire into the machine, means for severing and bending the staples, means for guiding the staples to the points of contact between the strand wires and the pickets, means for bending the staples around the strand wires and pickets, and actuating means for the feeding mechanism for the picket wire which causes a proper length thereof to be fed into the machine between the actions of the shears upon said wire.

6. In a wire fence machine, the combination of means for feeding strand wires through the machine, means for placing pickets in proper contact with the strand wires, means for feeding staple wire into the machine, means for cutting off sufficient wire to form the staples required to secure one picket to the strand wires, means to cut the wire into staple lengths, means to bend each staple intermediate its ends and then feed it to a point of contact of the picket and a strand wire, and means to bend the ends of the staple around the picket and strand wire, said means comprising pairs of dies and movable plungers to force the staples into said dies.

7. In a wire fence machine, the combination of means for intermittently feeding strand wires upward through the machine, means for feeding picket wire substantially constantly into the machine, a movable frame, a revoluble holder to receive the picket wire mounted on the frame, means to move the frame and revolve the holder to carry the picket wire against the strand wires, means to cut off a picket at each movement of the frame, and means to secure the picket to the strands.

8. In a wire fence machine, the combination of a pair of constantly running grooved feed rolls for the staple wire, means for pressing said rolls toward each other to grip said wire, a grooved vertically movable member to receive the wire, a stop thereon, a series of staple formers and shears in pairs, one former and shear of each pair mounted on the vertically movable member, a stationary support for the other members of each pair, a shear for said wire, means to convey a length of said wire when sheared to said formers and shears, means to feed strand and picket wires into the machine, means to guide the finished staples to the points of contact between the strand and picket wires, and means to bend the staples around the strands and pickets.

9. In a wire fence machine, the combination of means for feeding strand wires, picket wire and staple wire into the machine, means for cutting the picket wire and placing the picket in position against the strand wires, means for cutting off a length of staple wire sufficient to form the desired number of staples, means for cutting such length into blanks and bending the blanks into staples, means for guiding the staples to the points of contact between the pickets and strand wires, and means for bending the staples around said pickets and strand wires.

10. In a wire fence machine, the combination of intermittently operating means for feeding strand wires upwardly through the machine, spring-pressed means for feeding picket wire and staple wire horizontally into the machine, means for cutting the picket wire and placing the picket in position against the strand wires, means for cutting off a length of staple wire sufficient to form the desired number of staples, means for cutting such length into blanks and bending the blanks into staples, means for guiding the staples to the points of contact between the pickets and strand wires, and means for bending the staples around said pickets and strand wires.

11. In a wire fence machine, the combination of means for feeding strand wires, picket wire and staple wire into the machine, means for cutting the picket wire and placing the picket in position against the strand wires, means for cutting off a length of staple wire sufficient to form the desired number of staples, means for cutting such length into blanks and bending the blanks into staples, means for guiding the staples to the points of contact between the pickets and strand wires, means for bending the staples around said pickets and strand wires, a set of crimping members through which the finished fabric passes and an intermittently revolving baler upon which the fabric is wound.

12. In a wire fence machine, the combination of means for feeding strand wires, picket wire and staple wire into the machine, means for cutting the picket wire and placing the picket in position against the strand wires, means for cutting off a length of staple wire sufficient to form the desired number of staples, means for cutting such length into blanks and bending the blanks into staples, means for guiding the staples to the points of contact between the pickets and strand wires, means for bending the staples around said pickets and strand wires, a baler upon which the finished fabric is wound, and means for revolving the baler comprising a crank whose stroke decreases constantly at each actuation of the baler during the winding of a bale.

13. In a wire fence machine, the combination of means for feeding strand wires, picket wire and staple wire into the machine, means for cutting off the picket wire and placing the picket in position against the strand wires, a vertically movable horizontal rail, a horizontal stationary rail, shear members mounted on said rails for cutting off a length of staple wire sufficient to form the desired number of staples, means mounted on said rails for cutting said length into blanks and bending the blanks into staples, means mounted on the stationary rail for guiding the staples to the points of contact between the strand wires and picket, a pair of bending dies for each staple, means for positioning the dies around the strand wires and picket, and means mounted on the movable rail for forcing the staples into said dies.

14. In a wire fence machine, the combination of means for feeding strand wires, picket wire and staple wire into the machine, means for cutting off the picket wire and placing the picket in position against the strand wires, constantly running hollow twisters through which the outer two strand wires pass for twisting the ends of the picket around said strand wires, a vertically movable rail and a stationary rail parallel thereto, shear members mounted on said rails for cutting off a length of staple wire sufficient to form the desired number of staples, shearing and bending members in pairs, one of each pair mounted on the stationary rail and the other on the movable rail, means for placing the length of staple wire between said shearing and bending members, means to actuate the movable rail to cause said members to cut the wire into blanks and bend the blanks into staples, means to guide said staples to the points of contact between the picket and strand wires, and means for bending the staples around the strand wires and picket.

15. In a wire fence machine, the combination of means for feeding strand wires, picket wire and staple wire into the machine, means for cutting off the picket wire and placing the picket in position against the strand wires, constantly running hollow twisters through which the outer two strand wires pass for twisting the ends of the picket around said strand wires, a vertically movable rail and a stationary rail parallel thereto, shear members mounted on said rails for cutting off a length of staple wire sufficient to form the desired number of staples, shearing and bending members in pairs, one of each pair mounted on the stationary rail and the other on the movable rail, means for placing the length of staple wire between said shearing and bending members, each of said members consisting of a flat plate, the stationary plates being formed with ribs over which the staple blanks may be bent and the movable plates having grooves to receive said ribs, each of said plates being formed with a shearing edge, means to actuate the movable rail to cause said members to cut the wire into blanks and bend the blanks into staples, means to guide said staples to the points of contact between the picket and strand wires, and means for bending the staples around the strand wires and picket.

16. In a wire fence machine, the combination of a main frame, means for feeding strand wires, picket wire and staple wire into the machine, means for cutting off the picket wire and placing the picket in position against the strand wires, a vertically movable rail and a stationary rail, shear members mounted on said rails for cutting off a length of staple wire sufficient to form the desired number of staples, shearing and bending members in pairs, one of each pair mounted on the stationary rail and the other on the movable rail, a shaft mounted in the main frame of the loom and a series of downwardly extending fingers mounted on said shaft, one for each pair of bending members, means for rocking the shaft to cause the fingers to place the length of staple wire between said shearing and bending members, means to actuate the movable rail to cause said members to cut the wire into blanks and bend the blanks into staples, means to guide the staples to the points of contact between the picket and the strand wires, and means for bending the staples around the strand wires and pickets.

17. In a wire fence machine, the combination of means for intermittently feeding strand wires through the machine, means for feeding picket wires substantially constantly through the machine, a slidable frame, a holder movably mounted on the frame to receive the picket wire, means to slide the frame and move the holder relative to the frame to carry the picket wire against the strand wires, means to shear the picket wire into proper lengths, and means to secure the picket wire to the strands.

18. In a wire fence machine, the combination of a main frame, means for guiding the strand and picket wires into the machine, means to secure the pickets to the strand wires, means to wind the finished fabric into bales, means to actuate the baling mechanism, and three freely rotatable fluted rollers to corrugate the strand wires and be driven thereby, said corrugating rollers being mounted between the means for securing the pickets to the strand wires and the baling mechanism.

19. In a wire fence machine, the combination of a main frame, means for guiding the strand and picket wires into the machine, means to secure the pickets to the strand wires, means to wind the finished fabric into bales, means to actuate the baling mechanism, and three freely rotatable fluted rollers to corrugate the strand wires, said rollers being formed of supporting rollers and parallel evenly spaced cylinders extending along the rollers.

20. In a wire fence machine, the combination of means for intermittently feeding strand wires upwardly through the machine, means for feeding picket wire into the machine, a movable frame, a set of longitudinally grooved rollers to receive the picket wire and a shaft to carry the rollers, bearings on the frame to support the shaft, means to move the frame back and forth, a pinion on said shaft and a stationary rack-bar meshing therewith to cause the shaft and rollers to turn the distance between grooves at each forward actuation of the frame to carry the picket wire against the strand wires, means to cut off a picket at each movement of the frame, and means to secure the picket to the strands.

21. In a wire fence machine, the combination of a main frame, means for guiding strand wires through the machine, a pair of longitudinally perforated constantly revolving twisters, through which the outer strand wires pass, a stationary bearing for each twister, the axes of said twisters being inclined toward each other in the direction of movement of said strand wires, said twisters having projections for engaging the ends of pickets and wrapping said ends around the outer strand wires.

22. In a wire fence machine, the combination of a main frame, means for guiding strand wires through the machine, a pair of constantly revoluble twisters through which two of the strand wires pass, a stationary bearing for each twister, the axes of said twisters being inclined toward each other in the direction of movement of said strand wires, said twisters having projections for engaging picket wires and wrapping them around the strand wires, and means for intermittently moving the strand wires through the machine.

23. In a wire fence machine, the combination of means for feeding the staple wire, means to cut the wire into predetermined lengths, a movable member, a series of staple shears and formers in pairs, one shear and former of each pair mounted on the movable member, a stationary support for the other members of each pair, means to convey a length of said wire to said shears and formers, means to guide the finished staples to points of contact between strand and picket wires, means to feed and position the strand and picket wires, and means to bend the staples around the strand and picket wires.

24. In a wire fence machine, the combination of means for continuously feeding the staple wire, means to cut the staple wire into separate lengths sufficient to form all the staples for one picket, a movable member, and a stationary member, a series of staple formers and shears in pairs, one former and shear of each pair being mounted on the stationary member and the other on the movable member, means for positioning strand wires and pickets, a series of dies in pairs, one member of each pair being movable to permit the pickets to be placed in contact with the strand wires, means to press the dies of each pair together, means to convey a staple to each pair of dies, and means mounted on said movable member to force the staple into the dies for the purpose of bending it around the picket and a strand wire.

25. In a wire fence machine, the combination of a main frame, means for guiding strand wires into the machine, means for securing pickets thereto, means to bale the finished fabric, and a plurality of fluted rolls in the path of the fabric to the baler adapted to be rotated by the finished fabric, said fabric extending around each of said rolls more than one half its circumference.

26. In a wire fence machine, the combination of a main frame, means for guiding strand wires into the machine, means for securing pickets thereto, means to bale the finished fabric, and three freely rotatable fluted rolls adapted to be rotated by the finished fabric so mounted in said main frame that the fabric will engage substantially three fourths of its circumference of one of the rolls and be held against said first roll by a second roll.

27. In a wire fence machine, the combination of main frame, means for guiding strand wires into the machine, means for securing pickets thereto, means to bale the finished fabric, and a set of three freely rotatable fluted rolls adapted to be rotated by the finished fabric mounted in said main frame around which rolls the fabric passes, one of said rolls receiving the fabric directly from the picket securing means, a second roll engaging the fabric to cause it to engage the first for about three-fourths of its circumference, and the third roll engaging the fabric to cause it to firmly engage the second roll at the point of disengagement.

28. In a wire fence mechine, the combination of means for forming a fence fabric therein, a baler to receive the finished fabric, and means for revolving the baler comprising a crank, and means to variably decrease at a diminishing ratio the stroke of the crank in proportion to the increase in diameter of the bale of fabric.

29. In a wire fence machine, the combination of means for forming a fence fabric therein, a baler to receive the finished fabric and a shaft for the baler, a clutch coupling on one end of the shaft, means to actuate the coupling to turn the shaft, a second crank and a crank-pin therefor, means to variably change the stroke of the crank at a diminishing rate, and means connected to the crank pin and to the coupling actuating means whereby said baler will be caused to turn decreasing distances at succeeding actuations of said crank.

30. In a wire fence machine, the combination of means for forming a fence fabric, a baler to receive the finished fabric, a crank for revolving the baler, and means to automatically decrease the stroke of the crank at a varying ratio so that the feed of the finished fabric shall be uniform.

31. In a wire fence machine, the combination of means for feeding strand wires through the machine, means for feeding picket wire into the machine, a revoluble multi-grooved cylindrical holder to receive the picket wire, means to revolve the holder to carry the picket wire against the strand wires, means to cut off a picket at each actuation of the holder, and means to secure the picket to the strands.

32. In a wire fence machine, the combination of means for constantly feeding strand wires through the machine, means for feeding picket wire into the machine, a holder to receive the picket wire, means to actuate the holder to carry the picket wire against the strand wires and hold it there until said picket is secured to the strand wires and to simultaneously receive the wire for the next picket, and means to secure the picket to the strand wires.

33. In a wire fence machine, the combination of means for feeding strand wires through the machine, means for feeding picket wire into the machine, a rotatable holder having a groove substantially the length of a picket to guide and hold the picket wire, means to turn the holder to carry the picket wire against the strand wires and hold it there until said picket wire is secured to the strand wires, and means to secure the picket to the strand wires.

34. In a wire fence machine, the combination of a baler, a swiveled bearing for one end thereof, means to swing the baler and the bale thereon away from the machine, a cradle to receive the bale and baler, and means movable longitudinally of the baler to strip the bale from the baler.

35. In a wire fence machine, the combination of a baler, a swiveled bearing for one end thereof, means to swing the baler and the bale thereon away from the machine, a cradle to receive the bale and baler, a carriage movable longitudinally of the baler to strip the bale from the baler, and a pivotally mounted support adapted to be swung up to operative position to support the baler when the bale has been removed therefrom.

GEORGE F. CONNER.

Copies of this patent may be obtained for five cents each, by addressing the "Commissioner of Patents, Washington, D. C."